(12) United States Patent
Kishibata et al.

(10) Patent No.: US 7,400,111 B2
(45) Date of Patent: Jul. 15, 2008

(54) BATTERY AND ELECTRIC UNIT ASSEMBLY FOR VEHICLE

(75) Inventors: Kazuyohsi Kishibata, Numazu (JP); Masahiko Endou, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 63 days.

(21) Appl. No.: 11/449,256

(22) Filed: Jun. 8, 2006

(65) Prior Publication Data
US 2006/0279086 A1    Dec. 14, 2006

(30) Foreign Application Priority Data
Jun. 8, 2005    (JP) .............................. 2005-167908

(51) Int. Cl.
*H01M 10/46*    (2006.01)
(52) U.S. Cl. ..................................... 320/104
(58) Field of Classification Search ................ 320/104, 320/107, 118, 112
See application file for complete search history.

(56) References Cited

U.S. PATENT DOCUMENTS 5,666,040 A * 9/1997 Bourbeau .................... 320/118
6,242,889 B1 * 6/2001 Belyo ......................... 320/128

FOREIGN PATENT DOCUMENTS

JP    2000-209891    7/2000
JP    2001-69796     3/2001

* cited by examiner

*Primary Examiner*—Edward Tso
(74) *Attorney, Agent, or Firm*—Pearne & Gordon LLP

(57) ABSTRACT

An on-vehicle battery and electric unit assembly including: a battery mounted to a body of a vehicle driven by an engine; and an electric unit in which components of an electrical circuit connected to the battery are housed in a unit case provided with a positive DC terminal and a negative DC terminal connected to a positive terminal and a negative terminal of the battery, wherein the electric unit is placed adjacent to the battery, and the positive terminal and the negative terminal of the battery are connected to the positive DC terminal and the negative DC terminal of the electric unit by a positive busbar and a negative busbar, respectively.

4 Claims, 4 Drawing Sheets

BATTERY AND ELECTRIC UNIT ASSEMBLY FOR VEHICLE

TECHNICAL FIELD OF THE INVENTION

The present invention relates to an on-vehicle battery and electric unit assembly comprised of an on-vehicle battery, and an electric unit included in a vehicle.

BACKGROUND OF THE INVENTION

Generally, a generator such as a magneto generator is mounted to an engine for driving a vehicle, and a battery that supplies electric power to various electrical components is charged by an output of the generator. Electric units such as a control unit of various electrical components or a voltage regulator are connected to both ends of the battery. Many of the electric units connected to the battery require passage of a large current.

In recent years, a rotating electric machine that operates as a starter motor at a start of an engine and operates as a battery charging generator after the start of the engine has been developed and in practical use. The rotating electric machine used for this purpose is referred to as a starter generator that serves as both a starter motor and a battery charging generator. In order to operate the starter generator, a control unit that controls energization from the battery to the starter generator and energization from the starter generator to the battery needs to be connected to the battery. A large current of about 100 A is passed through the control unit in the energization from the battery to the starter generator to operate the starter generator as the starter motor.

A starter generator is disclosed in, for example, Japanese Patent Application Laid-Open Publication No. 2000-209891. The starter generator disclosed in Japanese Patent Application Laid-Open Publication No. 2000-209891 comprises a rotor having a magnetic field and mounted to a crankshaft of an engine, and a stator having a polyphase armature coil wound around an iron core having magnetic pole portions facing magnetic poles of the rotor, and is operated as a brushless motor at a start of the engine and operated as a magneto generator used for charging a battery after the start of the engine.

As disclosed in Japanese Patent Application Laid-Open Publication No. 2000-209891, a control unit used for operating the starter generator is comprised of a driver and a controller that controls the driver. The driver comprises a full-wave rectifier circuit that rectifies an AC output supplied from armature coils and supplies the DC output to a battery in operation of the starter generator as the generator, and an inverter-type switch circuit that supplies a drive current from the battery to the starter generator in operation of the starter generator as the motor.

Generally, an on-vehicle electric unit connected to a battery is supported in a position away from the battery, and the electric unit and the battery are connected by a wire. FIG. 8 shows an example of a vehicle including a starter generator. The shown vehicle 1 is an ATV (an All Terrain Vehicle, so-called a buggy), and comprises a vehicle body 3 including an engine 2, a pair of front wheels 5 operated by a steering handle 4, and a pair of rear wheels 6, and the front wheels 5 and the rear wheels 6 are driven by the engine 2. A reference numeral 7 denotes a starter generator (SG), which is comprised of a rotor having a magnetic field and mounted to a crankshaft of the engine 2, and a stator having three-phase armature coils wound around an iron core and secured to a case of the engine.

In the shown example, a battery 8' and a control unit 9' are included in rear and front portions of the vehicle body 3, and a positive DC terminal and a negative DC terminal of the control unit 9' and a positive terminal and a negative terminal of the battery 8' are connected by wires 10 and 11, respectively. Three-phase AC terminals of the control unit 9' are connected to terminals of three-phase armature coils of a starter generator by three wires $12u$ to $12w$.

A driver provided in the control unit 9' comprises a full-wave rectifier circuit that rectifies an AC output of the armature coils of the starter generator, and thus if the battery 8' is accidentally reversely connected, the battery 8' is short-circuited by diodes that constitute the full-wave rectifier circuit. When the battery 8' is thus short-circuited, a large short-circuit current is passed from the battery through the full-wave rectifier circuit, which destroys rectifier elements that constitute the rectifier circuit in an instant.

In such a driver of the control unit, as disclosed in Japanese Patent Application Laid-Open Publication No. 2000-209891, MOSFETs are often used as switch elements that constitute an inverter-type switch circuit, and parasitic diodes formed between drain and source thereof constitute the full-wave rectifier circuit. In this case, if the battery is reversely connected, the MOSFETs themselves are destroyed. In order to prevent such an accident, as disclosed in Japanese Patent Application Laid-Open Publication No. 2001-69796, providing a protection device is proposed comprising a relay having a contact inserted between a battery and a driver, and a control circuit that controls to excite the relay to close the contact only when the battery is connected in a correct direction.

However, if the battery 8' and the electric unit (the control unit 9' in the above example) are connected by the wires as in the conventional vehicle, vibration transferred from the vehicle body causes large vibration of the wires to apply a large force to connecting portions between the wires 10 and 11 and the battery 8' and connecting portions between the wires 10 and 11 and the control unit 9', which may cause detachment of the wires 10 and 11 from the battery 8' and/or the control unit 9' or loosen the connecting portions. Particularly for a vehicle such as an ATV for driving on rough ground, large vibration is transferred from the vehicle, and thus it is not preferable that the battery and the control unit are connected by the long wires as shown in FIG. 8. When wires 10 and 11 having large diameters are used for passing a particularly large current, the wires have large masses, thereby prominently causing the above described problem.

Also, when the battery and the electric unit are connected by the wires, routing of the wires is troublesome, thereby increasing the number of steps of assembling the electric unit to the vehicle to increase costs. Thus, the number of places connected by the wires is desirably as small as possible.

Further, when the battery and the electric unit are connected by the wires, electric resistance of wiring between the battery and the electric unit increases to increase losses in the necessity of passing a large current from the battery to the electric unit.

As disclosed in Japanese Patent Application Laid-Open Publication No. 2001-69796, when the protection device is provided in the control unit to guard against accidental reverse connection of the battery, the size and also the cost of the control unit 9 increase.

In the above description, the case where the electric unit connected to both ends of the battery is the control unit of the starter generator has been described by way of example, but the same problem occurs when the electric unit connected to the battery is any other unit such as a voltage regulator.

SUMMARY OF THE INVENTION

An object of the present invention is to provide an on-vehicle battery and electric unit assembly that can connect a battery and an electric unit without a wire to reduce costs and facilitate mounting to a vehicle body, and can eliminate the risk of disconnection between the battery and the electric unit caused by vibration of the vehicle body.

Another object of the present invention is to provide an on-vehicle battery and electric unit assembly that can reduce wiring resistance between a battery and an electric unit to reduce losses in passage of a large current.

A further object of the present invention is to provide an on-vehicle battery and electric unit assembly that can connect a battery and an electric unit without a wire, and can also prevent reverse connection of the battery in installation of the battery in a vehicle body.

The present invention relates to an on-vehicle battery and electric unit assembly comprising: a battery mounted to a body of a vehicle driven by an engine; and an on-vehicle electric unit in which components of an electrical circuit connected to the battery are housed in a unit case provided with a positive DC terminal and a negative DC terminal connected to a positive terminal and a negative terminal of the battery.

In the present invention, the electric unit is placed adjacent to the battery, and the positive terminal and the negative terminal of the battery are connected to the positive DC terminal and the negative DC terminal of the electric unit by a positive busbar and a negative busbar, respectively.

As described above, the electric unit is placed adjacent to the battery, the positive terminal and the negative terminal of the battery are connected to the positive DC terminal and the negative DC terminal of the electric unit by the positive busbar and the negative busbar, respectively, and thus the battery and the electric unit can be electrically connected without a wire that requires troublesome routing, thereby reducing the number of steps of an operation to mount the electric unit to the vehicle body to reduce costs of the vehicle.

Further, comprised as described above, the battery and the electric unit are connected by the busbars within a close distance, and thus wiring resistance between the battery and the electric unit can be minimized to reduce losses of the wiring resistance and efficiently supply electric power from the battery to an electric load.

The battery and the electric unit can be connected within the close distance, thereby preventing large vibration of members (the busbars) that connect the electric unit and the battery caused by vibration transferred from the vehicle body, and preventing an improper force from being applied to an electrical connecting portion between the battery and the electric unit. This prevents detachment or loosening of the connecting portion between the battery and the electric unit, and eliminates the risk of poor electrical connection or disconnection between the battery and the electric unit.

In a preferred aspect of the present invention, only when the positive terminal and the negative terminal of the battery are placed in predetermined positions relative to the positive DC terminal and the negative DC terminal, respectively, of the electric unit, the positive busbar and the negative busbar can be connected to corresponding terminals of the battery and the electric unit.

Such a construction prevents reverse connection of the battery relative to the electric unit, and thus eliminates the need for providing a protection device to guard against reverse connection of the battery in the electric unit. This reduces the size and cost of the electric unit.

In another preferred aspect of the present invention, a battery case having, on an outside thereof, a unit holder that holds the electric unit is provided, the battery is housed in the battery case, and the electric unit is held by the unit holder, and the battery case and the unit holder are comprised so that positions of the positive terminal and the negative terminal of the battery are uniquely determined when the battery is housed in the battery case, and positions of the positive DC terminal and the negative DC terminal of the electric unit are uniquely determined when the electric unit is held by the unit holder. The positive DC terminal of the electric unit held by the unit holder and the positive terminal of the battery, and the negative DC terminal of the electric unit and the negative terminal of the battery are connected by the positive busbar and the negative busbar, respectively, formed of conductive plates.

Comprised as described above, when the battery is housed in the battery case and the electric unit is held by the unit holder, the positions of the terminals of the battery and the electric unit are uniquely determined, thereby eliminating the risk of reverse connection of the battery relative to the electric unit. The positive DC terminal of the electric unit and the positive terminal of the battery, and the negative DC terminal of the electric unit and the negative terminal of the battery are connected by the positive busbar and the negative busbar, respectively, formed of the conductive plates, thereby allowing connection between the battery and the electric unit without a wire that requires troublesome handling.

In a further preferred aspect of the present invention, a battery case is provided that comprises a case body having, on a side surface thereof, a unit holder that holds the electric unit and having an open upper end, and an insulating resin cover placed to close the open upper end of the case body, and is mounted to the body of the vehicle, the battery is housed in the case body of the battery case, and the electric unit is held by the unit holder.

In this embodiment, the positive DC terminal and the negative DC terminal are provided on an upper portion of the electric unit held by the unit holder, and a positive busbar provided so that one end and the other end thereof are placed on the positive terminal of the battery and the positive DC terminal of the electric unit when the cover is placed on an upper end of the case body, and a negative busbar provided so that one end and the other end thereof are placed on the negative terminal of the battery and the negative DC terminal of the electric unit when the cover is placed on the upper end of the case body are molded in the cover. Then, one ends of the positive busbar and the negative busbar are connected to the positive terminal and the negative terminal, respectively, of the battery by bolts, and the other ends of the positive busbar and the negative busbar are connected to the positive DC terminal and the negative DC terminal, respectively, of the electric unit by bolts.

Comprised as described above, the positive terminal and the negative terminal of the battery can be connected to the positive DC terminal and the negative DC terminal of the electric unit only when the battery is housed in the battery case in a correct direction and the electric unit is held by the unit holder in a correct direction, thereby reliably preventing false connection of the battery. Also, the battery and the electric unit can be correctly connected simply by placing the cover on the case body and bolting the ends of the busbars to corresponding terminals after housing of the battery in the case body, thereby facilitating mounting of the battery and electric unit assembly to the vehicle body.

In a further preferred aspect of the present invention, a metal frame secured to the body of the vehicle is provided, the battery case is secured to the metal frame by bolts, the bolts that secure the battery case to the metal frame are brought into electrical contact with part of the negative busbar so that the negative busbar is earthed to the body of the vehicle.

Comprised as described above, the battery and electric unit assembly is mounted to the vehicle to allow the negative terminal of the battery to be automatically earthed to the vehicle body, thereby omitting connection of an earth and facilitating mounting of the battery and electric unit assembly to the vehicle body.

The present invention is particularly useful when the engine comprises a starter generator, and a control unit for the starter generator is connected to a battery as an electric unit. The control unit for the starter generator comprises an electrical circuit that constitutes: a driver that comprises a full-wave rectifier circuit that converts an AC output supplied from armature coils of the stator generator through the AC terminal in operation of the starter generator as a generator to a DC output and supplies the DC output from the positive DC terminal and the negative DC terminal to the battery, and an inverter-type switch circuit that converts the DC output supplied from the battery through the positive DC terminal and the negative DC terminal at a start of the engine to a drive current required for operating the starter generator as a motor and supplies the drive current from the AC terminal to the armature coils; and a controller that controls the driver.

BRIEF DESCRIPTION OF THE DRAWINGS

The above and other objects and features of the present invention will be apparent from the detailed description of the preferred embodiment of the invention, which is described and illustrated with reference to the accompanying drawings, in which.

DETAILED DESCRIPTION OF THE PREFERRED EMBODIMENT

Now, a preferred embodiment of the present invention will be described in detail with reference to the drawings.

Figure 1:
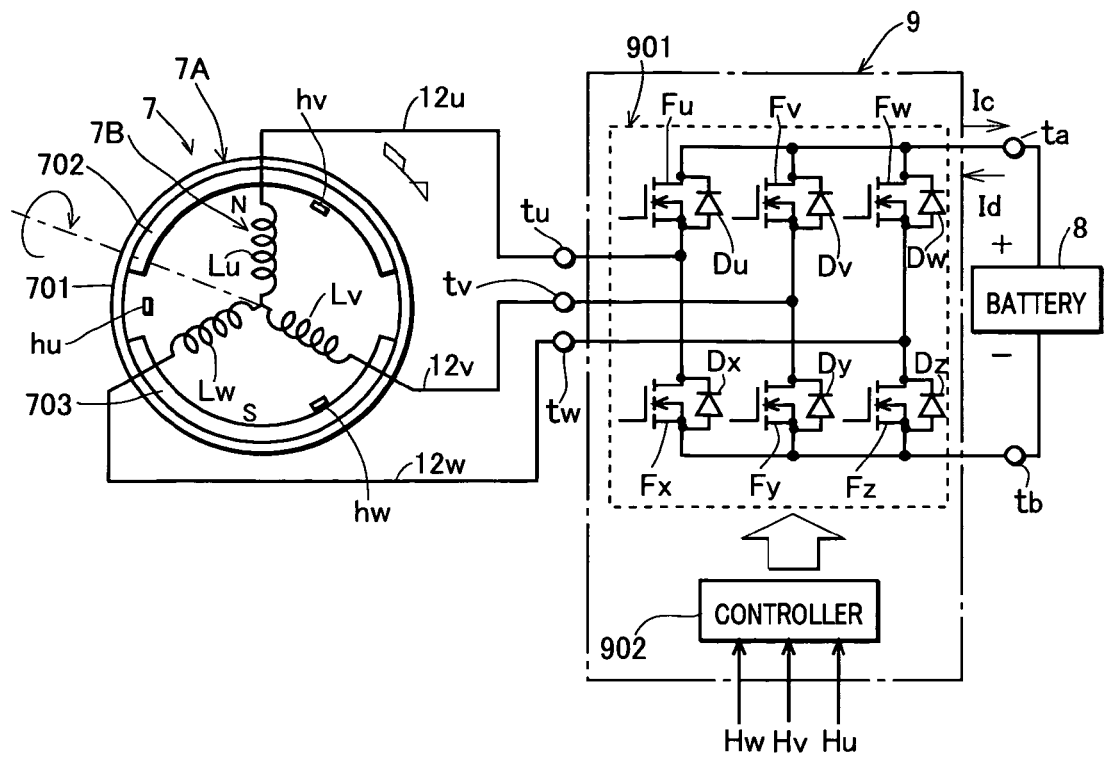
FIG. 1 is a schematic circuit diagram of electrical constructions of a starter generator and a control unit for the starter generator used in an embodiment of the present invention.

FIGS. 1 to 6 show an embodiment of the present invention when an electric unit connected to a battery is a control unit for a starter generator. In FIG. 1, a reference numeral 7 denotes a starter generator, which is comprised of a rotor 7A mounted to a crankshaft of an engine, and a stator 7B secured to a case of the engine. The rotor 7A is comprised of a cup-like iron flywheel (a rotor yoke) 701 mounted to the crankshaft of the engine, and arcuate permanent magnets 702 and 703 that are secured to an inner periphery of a peripheral wall portion of the flywheel 701, and magnetized to have different magnetic poles on inner peripheries thereof. In the shown example, the magnets 702 and 703 are magnetized diametrically of the flywheel so that a magnetic pole on the inner periphery of the magnet 702 is a north pole, and a magnetic pole on the inner periphery of the magnet 703 is a south pole.

The stator 7B is comprised of an armature core (not shown) having three magnetic pole portions facing a magnetic field of the rotor 7A, and three-phase armature coils Lu, Lv and Lw wound around the armature core. The three-phase armature coils Lu to Lw are star connected. Position sensors hu, hv and hw that detect a position of the magnetic pole of the rotor 7A relative to the armature coils Lu, Lv and Lw when the starter generator is driven as a brushless motor are provided on the side of the starter of the starter generator 7. As such position sensors, sensors similar to those widely used in known brushless motors, for example, hall ICs are used. The position sensors hu to hw output detection signals Hu to Hw indicating different levels between when the detected magnetic pole of the rotor is the north pole and when the magnetic pole of the rotor detected is the south pole.

In the shown example, the rotor 7A has two poles, and the stator has three poles, but for a starter generator operated as a three-phase brushless motor at a start of an engine, the number of magnetic poles of a rotor may be 2n (n is an integer equal to or more than 1) and the number of magnetic poles of a stator may be 3n as in a general brushless motor.

A reference numeral 9 denotes a control unit for the starter generator, and the control unit comprises a driver 901 and a controller 902 that controls the driver 901.

The driver 901 is similar to a driver that provided in a three-phase brushless motor, and comprises a diode bridge three-phase full-wave rectifier circuit constituted by diodes Du to Dw and Dx to Dz that form an upper side and a lower side, respectively, of a three-phase bridge, and an inverter-type switch circuit constituted by MOSFETs Fu to Fw and Fx to Fz that form the upper side and the lower side, respectively, of the three-phase bridge. In this example, parasitic diodes formed between drain and source of the MOSFETs Fu to Fw and Fx to Fz are used as the diodes Du to Dw and Dx to Dz that constitute the full-wave rectifier circuit.

A positive DC terminal ta and a negative DC terminal tb are led from a positive DC terminal and a negative DC terminal of the full-wave rectifier circuit and the switch circuit, and AC terminals tu to tw are led from three-phase AC terminals. The positive DC terminal ta and the negative DC terminal tb are connected to a positive terminal and a negative terminal, respectively, of a battery 8. The three-phase AC terminals tu to tw are connected to a terminal opposite to a neutral point of the armature coils Lu to Lw by wires 12u to 12w.

The controller 902 comprises a microprocessor, provides drive signals to the MOSFETs Fu to Fw and Fx to Fz that constitute the switch circuit of the driver on the basis of rotational angle position information of the rotor obtained from position detection signals Hu to Hw from the position sensors hu to hw at the start of the engine, passes a drive current Id commutated in a predetermined phase order from the battery 8 to the armature coils Lu to Lw, thereby producing a rotating magnetic field from the armature coils to rotate the rotor 7A in a direction of starting the engine.

After the start of the engine, the starter generator 7 is operated as the generator, and a charging current Ic is supplied from the armature coils Lu to Lw to the battery 8 through the full-wave rectifier circuit of the driver 901. The controller 902 simultaneously turns on/off the MOSFETs Fx to Fz that constitute the lower side of the bridge of the switch circuit of the driver 901 and the MOSFETs Fu to Fw that constitute the upper side of the bridge after the start of the engine to control an output voltage of the full-wave rectifier circuit so that a voltage applied across the battery 8 from the armature coils Lu to Lw through the full-wave rectifier circuit of the driver 901 does not exceed a set value. In this control, for example, the MOSFETs Fx to Fz are simultaneously turned on when the voltage across the battery 8 exceeds the set value to provide a short-circuit between output terminals of the generator through the MOSFETs and any of the diodes that constitute the full-wave rectifier circuit, thereby reducing the voltage across the battery. When the voltage across the battery 8 reaches the set value or less, the switch circuit of the driver 901 is controlled so that all the MOSFETs that constitute the switch circuit of the driver are turned off to apply a full-wave rectified output voltage of the armature coils Lu to Lw to the battery 8 without modification.

Besides the position detection signals Hu to Hw, output signals of a detection circuit that detects the voltage across the battery 8 or the like are input to the controller 902, but the inputs of these signals are not shown. In the embodiment, the MOSFETs are used as the switch elements that constitute each side of the bridge of the switch circuit of the driver 901, but other electric power switch elements such as bipolar power transistors or IGBTs (Insulated gate bipolar transistors) may constitute the switch circuit of the driver. When parasitic diodes that can pass a large current are not formed on each ends of the switch elements that constitute the switch circuit, diodes having large current capacities are connected in anti-parallel across the switch elements, respectively, and the full-wave rectifier circuit that rectifies the output of the armature coils Lu to Lw is constituted by the diodes.

Figure 3:
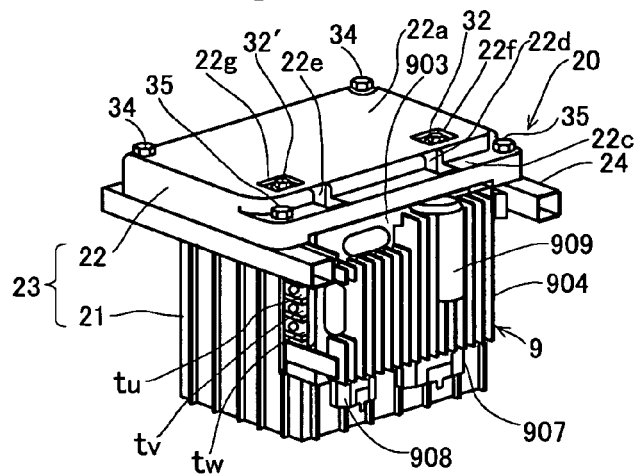
FIG. 3 is a perspective view of the battery and electric unit assembly according to the embodiment being assembled.
Figure 4:
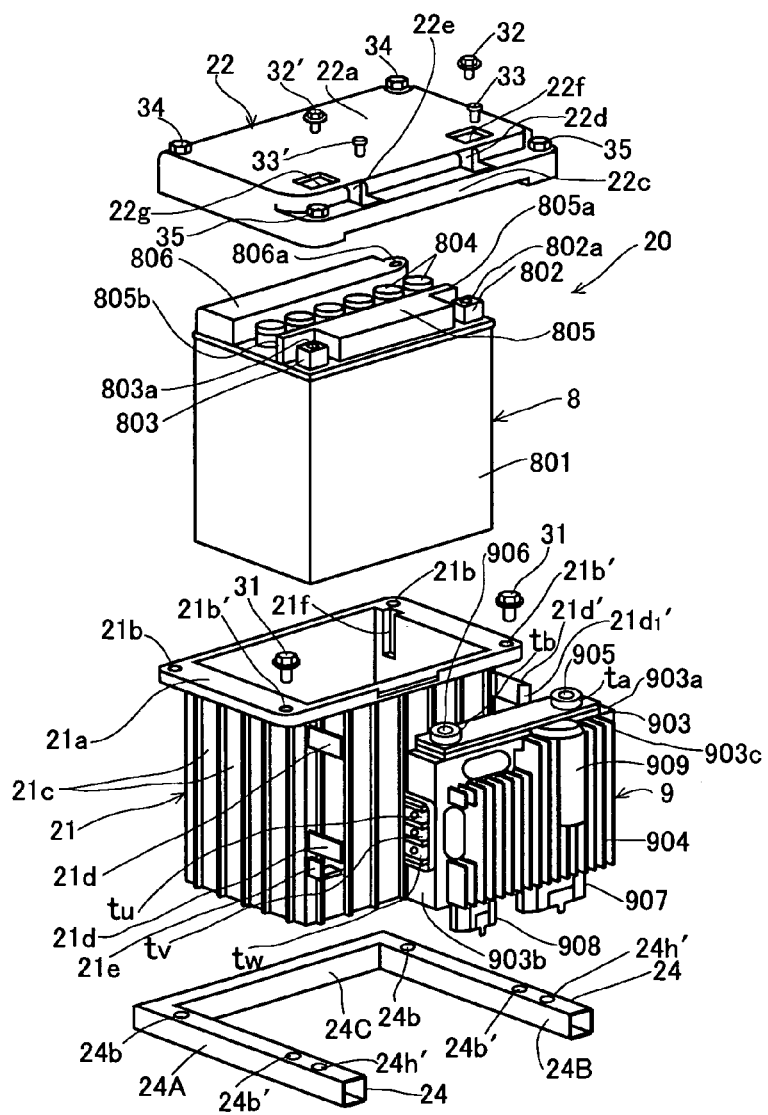
FIG. 4 is an exploded perspective view of the battery and electric unit assembly.
Figure 5:
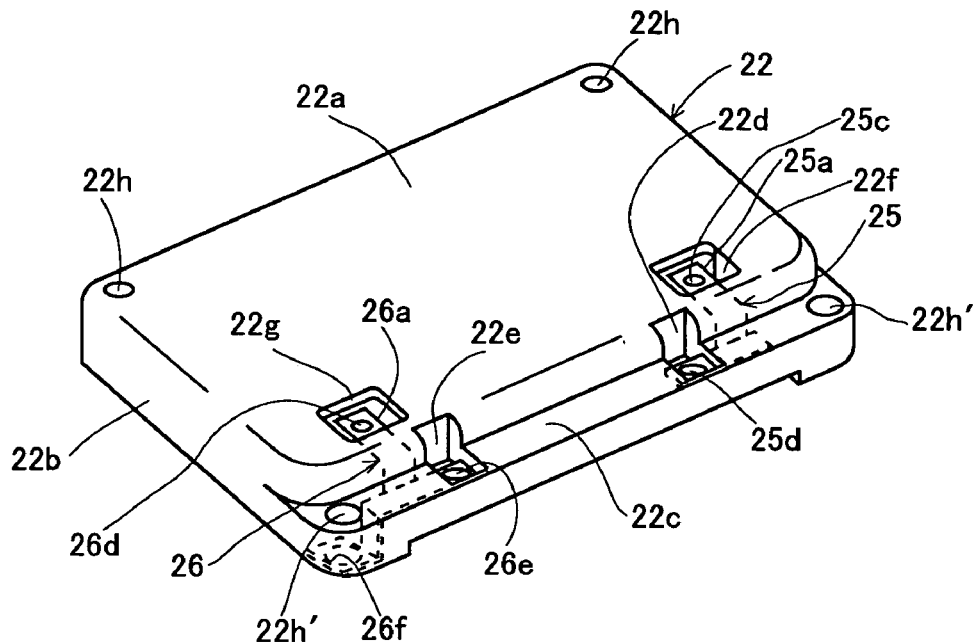
FIG. 5 is a perspective view of a cover of a battery case used in the embodiment.

As shown in FIGS. 3 and 4, components of the driver 901 and components of the controller 902 are housed in a flat rectangular unit case 903 made of insulating resin and unitized into a control unit (an electric unit) 9. A heatsink 904 is molded in the unit case 903, a radiating fin thereof protrudes outward from a front surface of the unit case, and a semiconductor device that requires heat radiation is mounted to an electronic component mounting surface of the heatsink placed in the case.

The shown control unit 9 is placed with one long side 903*a* of the unit case 903 being directed upward. As shown in FIG. 4, the positive DC terminal ta and the negative DC terminal tb are provided on an upper end of the unit case 903 at a certain interval, and these DC terminals have screw holes 905 and 906, respectively. The three-phase AC terminals tu to tw are provided on a side surface at one longitudinal end of the unit case 903. These AC terminals also have screw holes, and terminal fittings provided on one ends of the wires 12*u* to 12*w* that connect the controller and the terminals of the armature coils Lu to Lw are screwed to the AC terminals tu to tw. Couplers 907 and 908 for connecting signal wires that provide various signals to the controller 902 are mounted to a lower end of the unit case 903.

In FIGS. 3 and 4, a substantially cylindrical bulge 909 provided on the front surface of the unit case 903 is a portion in which a capacitor (not shown in FIG. 1) connected between the DC terminals of the driver 901 is housed.

The battery 8 comprises a battery case 801 that houses negative and positive pole plates and an electrolyte, and a positive terminal 802 and a negative terminal 803 are provided on an upper surface of the battery case 801 in positions close to one lateral end (close to a front surface of the battery case) and in positions close to both longitudinal ends of the battery case 801. The positive terminal 802 and the negative terminal 803 have screw holes 802*a* and 803*a* in the centers thereof. A plurality of liquid taps 804, 804, ... are provided in a line at the center on the upper surface of the battery case 801. A rectangular protruding portion 805 that extends longitudinally of the battery case between the positive terminal 802 and the negative terminal 803 is formed on the upper surface of the battery case 801 in a position close to the front surface of the battery case, and partition walls 805*a* and 805*b* that partition between the positive terminal 802 and the liquid taps and between the negative terminal 803 and the liquid taps, respectively, are integrally formed at both longitudinal ends of the protruding portion 805. A substantially rectangular protruding portion 806 that extends over substantially the entire longitudinal length of the battery case is formed on the upper surface of the battery case in a position close to a rear surface, and a positioning protrusion 806*a* protruding longitudinally of the protruding portion 806 is formed at one end of the protruding portion 806.

In the present invention, the control unit 9 is placed adjacent to the battery 8, and an on-vehicle battery and electric unit assembly 20 is comprised of the battery 8 and the control unit 9. The positive terminal and the negative terminal of the battery 8 are connected to the positive DC terminal ta and the negative DC terminal tb of the control unit 9 by a positive busbar and a negative busbar, respectively, formed of conductive plates.

Figure 2:
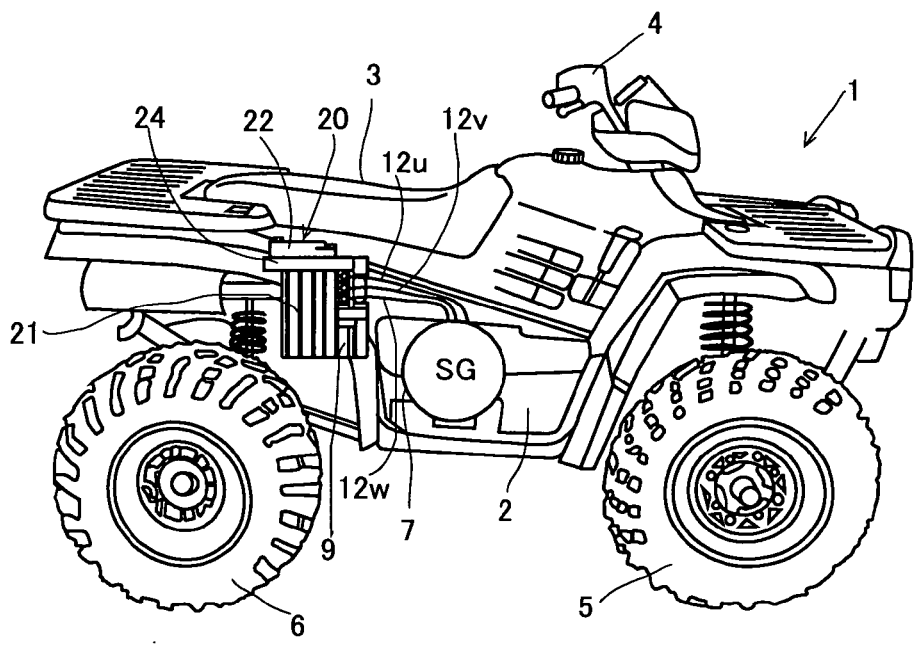
FIG. 2 is a perspective view of an example of a battery and electric unit assembly according to the present invention being mounted to a vehicle body.

In the embodiment, as shown in FIGS. 3 and 4, there is provided a battery case 23 that comprises a case body 21 having an open upper end, and an insulating resin cover 22 placed to close the open upper end of the case body 21, and as shown in FIG. 2, the battery case is mounted to a vehicle 1 driven by an engine 2.

Figure 8:
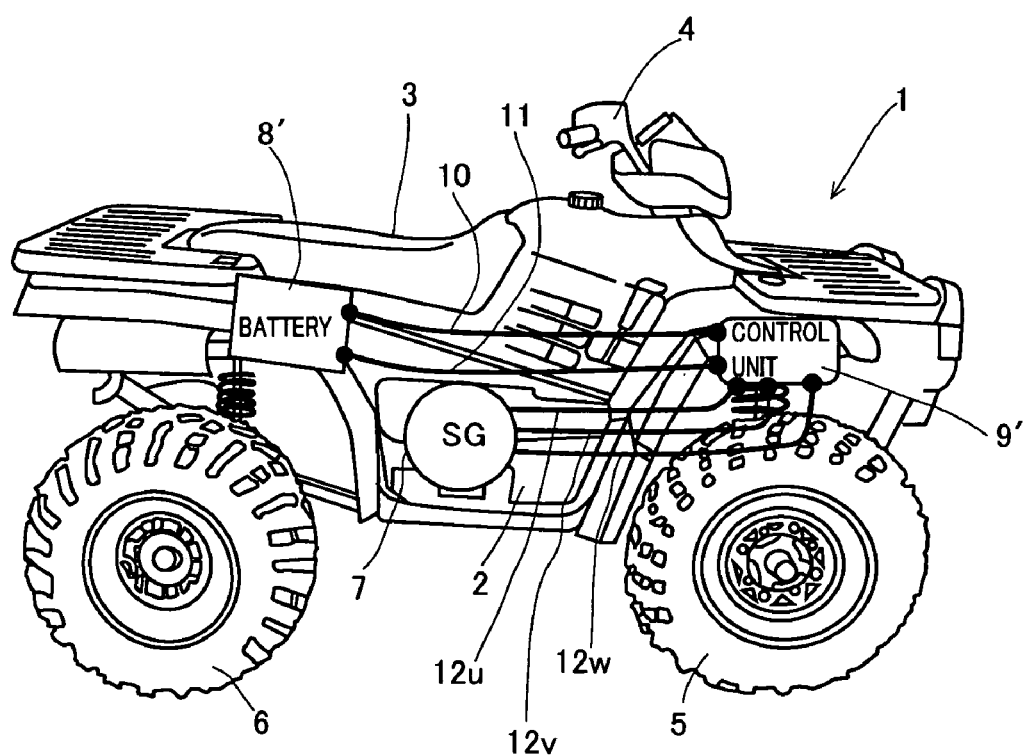
FIG. 8 is a perspective view of an electric unit connected to a battery being placed away from the battery and mounted to a vehicle.

The vehicle 1 shown in FIG. 2 is an ATV similar to that shown in FIG. 8, and comprises a vehicle body 3 including the engine 2, a pair of front wheels 5 operated by a steering handle 4, and a pair of rear wheels 6, and the front wheels 5 and the rear wheels 6 are driven by the engine 2. A starter generator 7 is mounted to the engine 2.

The case body 21 is formed into a rectangle having an inner space into which the battery 8 can be inserted substantially without a gap, and an outer flange 21*a* is formed at a peripheral edge of an upper end thereof. Through holes 21*b* and 21*b* are formed in both end corners of the flange 21*a* on a rear side of the case body, and through holes 21*b'* and 21*b'* are formed in both end corners of the flange 21*a* on a front side of the case body. These through holes are used for insertion of bolts for securing the case body to a frame described later. In order to reinforce the case body 21, many ridges 21*c* are formed on side surfaces thereof.

A unit holder comprised of first and second stays 21*d* and 21*d'* that hold the unit case 903 of the control unit 9 therebetween, and a pair of supports 21*e* that abut against both end corners in a lower end of the unit case 903 from below to support the unit case is mounted to a front surface of the case body 21. The stays 21*d* and 21*d'* and the supports 21*e* are made of metal, and secured to the case body 21 in a molded manner in the case body 21.

The first stay 21*d* is formed into a tongue shape, a pair of first stays 21*d* are provided on one end of the front surface of the case body at a vertically predetermined interval, and these stays 21*d* abut against a side surface 903*b* of the unit case 903 provided with the AC terminals tu to tw. The second stay 21*d'* is formed of an L-shaped member with a tip 21*d*1' being squarely bent toward the first stay 21*d*, a pair of second stays 21*d'* are provided on the other end of the front surface of the case body at a vertically predetermined interval, and the stays 21*d'* engage a side surface 903*c* opposite to the side surface 903*b* of the unit case 903 and the front surface of the unit case 903. The control unit 9 is held by the case body 21 with both lower ends of the unit case 903 being placed on the supports 21*e* and the stays 21*d* and 21*d'* abutting the side surfaces 903*b* and 903*c* of the unit case 903.

A groove 21*f* into which the positioning protrusion 806*a* provided in the battery 8 fits is formed in an inner surface of the case body 21, and the protrusion 806*a* fits into the groove 21*f* only when the battery 8 is inserted into the case body 21 in a correct direction to allow insertion of the battery 8 into the case body 21.

The cover 22 is comprised of a resin molding of a shallow box shape having a rectangular top plate portion 22*a* and a side wall portion 22*b* protruding downward from an outer periphery of the top plate portion, and the side wall portion 22*b* is dimensioned so that the side wall portion 22*b* fits an outer periphery of the flange 21*a* on the upper end of the case body 21 without a gap when the cover 22 is placed on the upper end of the case body 21. An extending portion 22*c* that extends above the control unit 9 held by the unit holder of the case body 21 when the cover is mounted to the upper end of the case body 21 is formed on a front side wall of the cover 22. The extending portion 22*c* has smaller thickness than other portions of the cover 22, and a step is formed between the other portions of the cover 22 and the extending portion 22*c*.

Recesses 22*d* and 22*e* that are aligned with the positive DC terminal ta and the negative DC terminal tb of the control unit 9 are formed over the extending portion 22*c* and part of the front side wall of the cover. Recesses 22*f* and 22*g* that are aligned with the positive terminal 802 and the negative terminal 803 of the battery inserted into the case body are formed in portions close to the front surface in the top plate portion 22*a* of the cover 22. Through holes 22*h* and 22*h* that are aligned with the through holes 21*b* and 21*b* provided in the flange of the case body are formed in both ends in portions close to the rear surface of the cover 22. Through holes 22*h'* and 22*h'* for insertion of the bolts for securing the cover 22 to the frame described later are formed in both ends of the extending portion 22*c*.

A positive busbar 25 and a negative busbar 26 formed of conductive plates of good conductive material such as copper are molded in the cover 22. As shown in FIG. 6B, the positive busbar 25 comprises an L-shaped first portion 25*a* and a second portion 25*b* which is integrated with the first portion 25*a*. The second portion 25*b* has a plate surface perpendicular to a plate surface at a tip of the first portion 25*a*, and one lateral end close to a rear end to the tip of the second portion 25*b* is connected to the tip of the first portion 25*a*. Holes 25*c* and 25*d* are formed through a rear end of the first portion 25*a* and a tip of the second portion 25*b*, respectively.

Figure 6A:
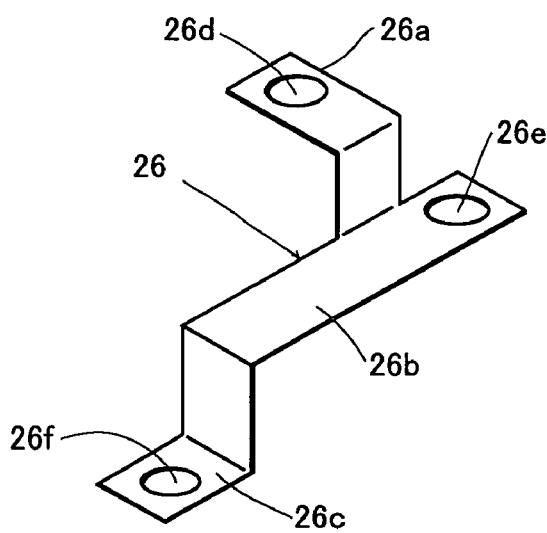
FIG. 6A is a perspective view of a negative busbar used in the embodiment of the present invention.
Figure 6B:
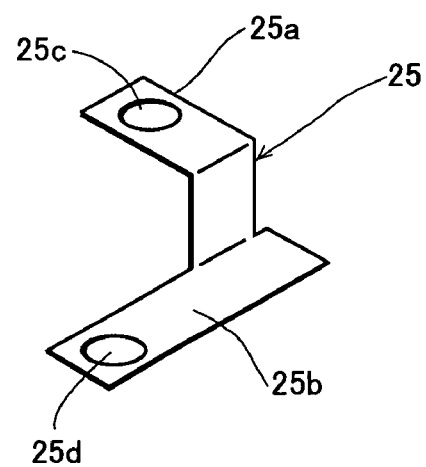
FIG. 6B is a perspective view of a positive busbar used in the embodiment of the present invention.

As shown in FIG. 6A, the negative busbar 26 is formed of a first portion 26*a* consisting of an L-shaped conductive plate, a second portion 26*b* consisting of a band-like conductive plate, and a third portion 26*c* consisting of an L-shaped conductive plate. The second portion 26*b* has a plate surface perpendicular to a plate surface of the first portion, and one lateral end close to a rear end of the second portion 26*b* is integrated with a tip of the first portion 26*a*. A rear end of the third portion 26*c* is integrated with a tip of the second portion 26*b*. A hole 26*d* is formed through a rear end of the first portion 26*a* of the negative busbar 26, and holes 26*e* and 26*f* are formed through a rear end of the second portion 26*b* and a tip of the third portion 26*c*, respectively.

Figure 7:
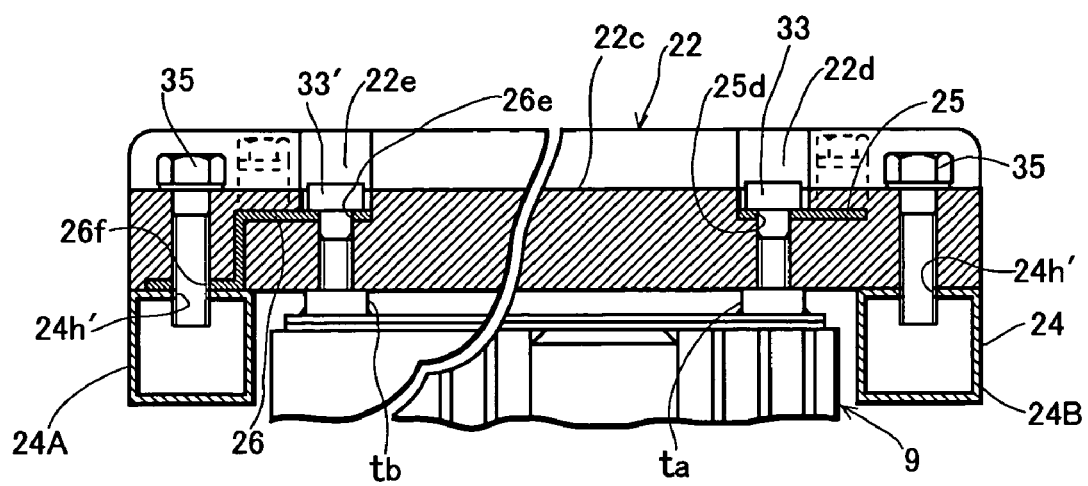
FIG. 7 is a sectional view, partially omitted, of a connecting portion between the cover of the battery case and a controller used in the embodiment.

The positive busbar 25 is molded in the cover 22 with the hole 25*c* being placed in the recess 22*f* in the cover and the hole 25*d* being placed in the recess 22*d*. The negative busbar 26 is molded in the cover 22 with the holes 26*d* and 26*e* being placed in the recesses 22*g* and 22*e*, respectively, of the cover, and as shown in FIG. 7, with the hole 26*f* being aligned with the hole 22*h'* in the cover provided close to the recess 22*e*, and a periphery of the hole 26*f* being exposed in a lower surface of the extending portion 22*c*.

Then, the positive busbar 25 and the negative busbar 26 are positioned so that with the cover 22 being mounted to the case body 21, the holes 25*c* and 25*d* in the positive busbar 25 are aligned with the screw hole 802*a* in the center of the positive terminal 802 of the battery 8 inserted into the case body and the screw hole 905 in the positive DC terminal ta of the control unit 9 held by the unit holder, and the holes 26*d* and 26*e* in the negative busbar 26 are aligned with the screw hole 803*a* in the center of the negative terminal 803 of the battery 8 and the screw hole 906 in the negative DC terminal tb of the control unit 9.

For mounting the battery case 23 to the vehicle body, a U-shaped metal frame 24 comprised of arms 24A and 24B extending in parallel with each other and a connecting portion 24C that connects one ends of the arms is provided in part of the vehicle body 3 integrally therewith in a position close to the starter generator 7 (see FIG. 2). The frame 24 holds the battery case 23 with the case body 21 of the battery case fitting between the arms 24A and 24B, and with the flange 21*a* on the upper end of the case body 21 being placed on the arms 24A and 24B and the connecting portion 24C. The arms 24A and 24B of the frame 24 have screw holes 24*b* and 24*b* aligned with the through holes 21*b* and 21*b* provided in the flange portion of the case body 21, screw holes 24*b'* and 24*b'* aligned with the through holes 21*b'* and 21*b'* provided in the flange portion of the case body 21, and screw holes 24*h'* and 24*h'* aligned with the through holes 22*h* and 22*h'* formed in both ends of the extending portion 22*c* of the cover.

In the embodiment, the on-vehicle battery and electric unit assembly 20 is comprised by housing the battery 8 in the case body 21 secured to the vehicle body 3 by the frame 24 and holding the control unit 9 with the unit holder on the front surface of the case body, and mounting the cover 22 to the case body 21 to connect between the positive terminal 802 of the battery and the positive DC terminal ta of the control unit and between the negative terminal 803 of the battery and the negative DC terminal tb of the control unit with the positive busbar 25 and the negative busbar 26.

The battery and electric unit assembly 20 according to the embodiment is mounted to the vehicle body 3 in the following steps. First, the case body 21 is inserted between the arms 24A and 24B of the frame 24 to place the flange 21 a on the frame 24, and bolts 31 and 31 passed through the through holes 21*b'* and 21*b'* provided in the flange 21*a* are screwed into the screw holes 24*b'* and 24*b'* in the frame 24 to secure the case body 21 to the frame 24. Then, the battery 8 is inserted into the case body 21 while the positioning protrusion 806*a* of the battery 8 being inserted into the groove 21*f* in the case body 21, and the control unit 9 is held by the unit holder on the front surface of the case body. The insertion of the battery into the case body or the mounting of the electric unit may be performed in any order.

Then, the cover 22 is placed on the upper end of the case body 21, bolts 32 and 32' passed through the hole 25*c* in the positive busbar 25 and the hole 26*d* in the negative busbar 26 are screwed into the screw holes 802*a* and 803*a* in the positive terminal 802 and the negative terminal 803 of the battery 8 to connect the busbars 25 and 26 to the positive terminal 802 and the negative terminal 803 of the battery. Bolts 33 and 33' passed through the hole 25*d* in the positive busbar 25 and the hole 26e in the negative busbar 26 are screwed into the screw holes 905 and 906 in the positive DC terminal ta and the negative DC terminal tb of the electric unit to connect the positive busbar 25 and the negative busbar 26 to the positive DC terminal ta and the negative DC terminal tb.

Then, bolts 34 and 34 passed through the through holes 22h and 22h in the cover 22 and the through holes 21b and 21b in the flange of the case body 21 are screwed into the screw holes 24b and 24b in the frame 24, bolts 35 and 35 passed through the through holes 22h' and 22h' in the cover 22 are screwed into the screw holes 24h' and 24h' in the frame 24, and thus the cover 22 is fastened to the flange 21a of the case body 21 and the frame 24 to complete assembly of the battery and electric unit assembly 20. The bolts 35 are screwed into the screw holes 24h' and 24h' in the frame 24 to electrically connect the negative busbar 26 to the metal frame 24, and thus the negative terminal of the battery 8 is earthed to the vehicle body 3.

After the assembly of the battery and electric unit assembly 20 as described above, the three-phase AC terminals tu to tw of the control unit 9 and the starter generator 7 are connected by the three-phase wires 12u to 12w.

As described above, the battery 8 and the control unit (the electric unit) 9 are connected by the busbars within a close distance, and thus wiring resistance between the battery 8 and the control unit can be minimized to reduce losses of the wiring resistance and efficiently supply electric power from the battery to an electric load. In the above embodiment, at the start of the engine, a large current of about 140 A needs to be passed from the battery 8 through the driver of the control unit, but such passage of the large current significantly increases losses of the wiring resistance between the battery and the control unit. According to the present invention, the battery and the control unit can be connected by the busbars within a close distance, and thus wiring resistance between the battery and the control unit can be minimized to reduce losses in passage of a large current.

As described above, the battery 8 and the control unit 9 are connected by the busbars 25 and 26 formed of conductive plates, thereby allowing electrical connection between the battery 8 and the driver of the electric unit without a large-diameter wire that requires troublesome routing.

The battery 8 and the control unit 9 can be connected by the busbars formed of the conductive plates within a close distance, thereby preventing large vibration of the busbars 25 and 26 caused by vibration transferred from the vehicle leading to loosening or detachment of the connecting portion between the battery and the electric unit.

Further, in the above embodiment, the battery 8 can be inserted into the case body 21 only when the battery 8 is placed in the correct direction, and the busbars 25 and 26 molded in the cover 22 can be connected to the positive terminal and the negative terminal of the battery only when the battery 8 is inserted into the case body 21 in the correct direction, thereby eliminating the risk of reverse connection of the battery to the electric unit. This eliminates the need for providing a protection device to guard against reverse connection of the battery in the control unit 9, thereby reducing the size and cost of the control unit 9.

In the above embodiment, the positioning protrusion 806a is provided in the battery case of the battery, and the protrusion 806a is fitted into the groove 21f in the inner surface of the case body 21, and thus the battery 8 is always inserted into the case body 21 in the correct direction. However, in the above embodiment, the positive terminal and the negative terminal of the battery are provided on the same lateral end of the battery case, and thus the busbars 25 and 26 molded in the cover 22 cannot be connected to the positive terminal 802 and the negative terminal 803 of the battery when the battery 8 is inserted into the case body 21 in the reverse direction. Thus, reverse connection of the battery can be prevented without the positioning protrusion 806a and the groove 21f.

In the above embodiment, the periphery of the hole 26f provided in the negative busbar 26 for insertion of the bolt 35 for securing the negative busbar 26 to the metal frame 24 is exposed in the lower surface of the extending portion 22c of the cover, and the negative busbar 26 is brought into contact with the metal frame 24 when the cover is fastened to the metal frame 24 by the bolt 35, and thus the negative busbar 26 can be earthed to the vehicle body 3 through the frame 24 even with an insulating bolt 35.

The structure for earthing the negative busbar to the vehicle body is not limited to the above example. For example, the negative busbar 26 may be electrically connected to the frame 24 and earthed to the vehicle body by exposing the periphery of the hole 26f provided in the negative busbar 26 for insertion of the bolt 35 for fastening the cover to the metal frame 24 in the upper surface of the extending portion 22c of the cover, and using a metal bolt 35 to bring a head of the bolt 35 into contact with the periphery of the hole 26f of the negative busbar.

In the above embodiment, the case where the electric unit held by the battery case is the control unit of the starter generator has been described by way of example, but the electric unit held by the battery case may be any other unit such as a voltage regulator unit that controls to keep a voltage supplied from a generator to a battery through a rectifier circuit at a set value or less. The present invention is particularly useful for an electric unit that requires passage of a large current.

Although the preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. A battery and electric unit assembly for a vehicle driven by an engine comprising:
   a battery case having a unit holder outside thereof and mounted to a body of said vehicle;
   a battery housed in said battery case;
   an electric unit which comprises a unit case held by said unit holder and components of an electric circuit to be connected to said battery, said unit case having a positive DC terminal and a negative DC terminal to be connected to a positive terminal and a negative terminal of said battery, and said components being housed in said unit case;
   wherein said battery case is comprised so that positions of the positive terminal and the negative terminal of said battery are uniquely determined when said battery is housed in said battery case, and said unit holder is comprised so that positions of the positive DC terminal and the negative DC terminal of said electric unit are uniquely determined when said electric unit is held by said unit holder, and
   the positive DC terminal of the electric unit held by said unit holder and the positive terminal of said battery are connected by a positive busbar formed of conductive plates, and the negative DC terminal of said electric unit and the negative terminal of said battery are connected by a a negative busbar formed of conductive plates.

2. A battery and electric unit assembly for a vehicle driven by an engine comprising:

a battery case mounted to a body of said vehicle, said case comprising a case body having an open upper end and a unit holder on a side surface thereof, and an insulating resin cover placed to close the open upper end of said case body;

a battery housed in said battery case;

an electric unit which comprises a unit case held by said unit holder and components of an electric circuit to be connected to said battery, said unit case having a positive DC terminal and a negative DC terminal to be connected to a positive terminal and a negative terminal of said battery, and said components being housed in said unit case;

wherein said positive DC terminal and said negative DC terminal are provided on an upper portion of the electric unit held by said unit holder, a positive busbar and a negative busbar are molded in said cover, said positive busbar being provided so that one end and the other end thereof are placed on the positive terminal of said battery and the positive DC terminal of said electric unit, respectively, when said cover is placed on an upper end of said case body, and a negative busbar provided so that one end and the other end thereof are placed on the negative terminal of said battery and the negative DC terminal of said electric unit, respectively, when said cover is placed on the upper end of said case body, and one end of said positive busbar and one end of said negative busbar are connected to the positive terminal of said battery and the negative terminal of said battery, respectively, by bolts, and the other end of said positive busbar and the other end of said negative busbar are connected to the positive DC terminal and the negative DC terminal of said electric unit, respectively, by bolts.

3. The battery and electric assembly for a vehicle driven by an engine according to claim 2, wherein a metal frame secured to the body of said vehicle is provided, and said battery case is secured to said metal frame by bolts, and said negative busbar is earthed to the body of said vehicle through said metal frame when said battery case is secured to said metal frame.

4. A battery and electric unit assembly for a vehicle driven by an engine comprising:

a battery mounted to a body of the vehicle;

an electric unit in which components of an electric circuit to be connected to said battery are housed in a unit case provided with a positive DC terminal and a negative DC terminal to be connected to a positive terminal of said battery and a negative terminal of said battery, respectively, wherein said electric unit is placed adjacent to said battery, and the positive terminal and the negative terminal of said battery are connected to the positive DC terminal and the negative DC terminal of said electric unit through a positive busbar and a negative busbar, respectively, wherein said engine comprises a starter generator, and an electric circuit of said electric unit constitutes: a driver that comprises a full-wave rectifier circuit that converts an AC output supplied from armature coils of said starter generator through said AC terminal to a DC output and supplies the DC output from said positive DC terminal and said negative DC terminal to said battery, when said starter generator operates as a generator and comprises an inverter-type switch circuit that converts a DC output supplied from said battery through said positive DC terminal and said negative DC terminal to a drive current required for operating said starter generator as a motor and supplies the drive current from said AC terminal to said armature coils when said engine is started; and a controller that controls said driver.

\* \* \* \* \*